(12) United States Patent
Yamazaki et al.

(10) Patent No.: US 8,376,620 B2
(45) Date of Patent: Feb. 19, 2013

(54) SLIDING BEARING

(75) Inventors: Masao Yamazaki, Toyota (JP); Masao Takahashi, Toyota (JP); Yasuhiro Hikita, Toyota (JP); Junichi Natsume, Toyota (JP); Toshimitsu Shiba, Toyota (JP); Takashi Kikuchi, Toyota (JP); Tatsuhiro Terada, Toyota (JP); Takashi Shimura, Toyota (JP)

(73) Assignees: Taiho Kogyo Co., Ltd., Toyota-shi, Aichi (JP); Toyota Jidosha Kabushiki Kaisha, Toyota-shi, Aichi (JP)

( * ) Notice: Subject to any disclaimer, the term of this patent is extended or adjusted under 35 U.S.C. 154(b) by 1923 days.

(21) Appl. No.: 10/922,130

(22) Filed: Aug. 19, 2004

(65) Prior Publication Data

US 2005/0047689 A1 Mar. 3, 2005

(30) Foreign Application Priority Data

Aug. 29, 2003 (JP) ................. 2003-308113

(51) Int. Cl.
*F16C 33/10* (2006.01)
*F16C 9/02* (2006.01)

(52) U.S. Cl. ............. 384/288; 384/291; 384/294

(58) Field of Classification Search ............. 123/54.4, 123/192.1, 196 R, 197.3; 384/286, 288, 384/291, 294, 429; 74/594
See application file for complete search history.

(56) References Cited

U.S. PATENT DOCUMENTS

| | | | | |
|---|---|---|---|---|
| 5,009,522 A | * | 4/1991 | Hahn | 384/288 |
| 6,585,419 B2 | * | 7/2003 | Ono et al. | 384/292 |
| 6,695,482 B2 | * | 2/2004 | Niwa et al. | 384/294 |
| 6,921,210 B2 | * | 7/2005 | Welch et al. | 384/294 |
| 7,234,870 B2 | * | 6/2007 | Kitahara et al. | 384/288 |
| 2003/0206671 A1 | * | 11/2003 | Vicars | 384/294 |

FOREIGN PATENT DOCUMENTS

| | | |
|---|---|---|
| JP | 63-109215 | 5/1988 |
| JP | 04-219521 | 8/1992 |
| JP | 2001241442 | * 9/2001 |

OTHER PUBLICATIONS http://www.daidometal.com/english/products/chapter01.pdf (first accessed on Feb. 15, 2008).*

* cited by examiner

*Primary Examiner* — James Pilkington
(74) *Attorney, Agent, or Firm* — Flynn, Thiel, Boutell & Tanis, P.C.

(57) ABSTRACT

A sliding bearing is constructed by an upper split bearing half and a lower split bearing half. The upper split bearing half has a sliding surface, in which an oil groove which allows a lubricating oil to flow therein is formed over the entire circumferential extent of the sliding surfaced. The oil groove extends through a crush relief to be open to a junction area, and the oil groove has a bottom which is formed so that a portion disposed toward the junction area as considered in the circumferential direction of the crush relief is located closer to the center of the upper split bearing half in comparison to a central portion. An ingress in large quantities of foreign particles within the oil groove onto the sliding surface of the sliding bearing and into a connecting rod bearing after passing through a lubricating oil feed passage is suppressed, and an oil leakage through the crush relief is reduced, allowing a lubricating oil pressure to be secured and augmented.

11 Claims, 4 Drawing Sheets

SLIDING BEARING

FIELD OF THE INVENTION

The present invention relates to a sliding bearing, an more particularly, to a sliding bearing in which one of split bearing halves is formed with an oil groove disposed along its sliding surface which allows a lubricating oil to flow therethrough.

DESCRIPTION OF THE PRIOR ART

A sliding bearing is known in the art as comprising a pair of split bearing halves and in which one of the split bearing halves includes in its sliding surface with an oil groove which allows a lubricating oil to flow therearound in the circumferential direction and in which crush reliefs are formed at the junction area between the both split bearing halves toward the sliding surface.

A sliding bearing of the kind described is known in which the oil groove is formed over the entire circumferential extend of the split bearing half and is open to the junction between the split bearing halves through crush reliefs (patent document 1: Japanese Laid-Open Patent Application No. 109,215/1988).

A sliding bearing is also known in which the bottom of the oil groove is formed so as to be located closer to the center position of the sliding surface as the bottom of the oil groove shifts from a central portion toward an end portion which is disposed toward the junction area as considered in the circumferential direction and the oil groove is terminated within the crush relief (eccentric end portion 36) (patent document 2: Japanese Patent Publication No. 65,615/1995).

A crankshaft which is slidably journaled by the inner periphery of the sliding bearing is formed with a lubricating oil feeding passage which feeds a lubricating oil from the oil groove and which feeds the lubricating oil thence to a space between the crankshaft and a connecting rod bearing.

In the sliding bearing disclosed in a patent document 1, the oil groove is open up to the junction area between the split bearing halves. Accordingly, foreign particles within the oil groove are restricted from flowing into the sliding surface of the sliding bearing and into the lubricating oil feeding passage. In this way, the ingress of such foreign particle onto the sliding surface and into the connecting rod bearing is suppressed. However, this method causes a reduction in the oil pressure within the mechanism, presenting a problem in maintaining the oil pressure required to operate the engine.

In the sliding bearing disclosed in patent document 2, the termination of the oil groove in the region of the crush reliefs allows the oil pressure in the mechanism to be secured and augmented, but there remains a problem as to foreign particles that accumulate in the end of the oil groove. Specifically, such particles may be carried in large quantities by the lubricating oil onto the sliding surface of the sliding bearing and into the connecting rod bearing through the lubricating oil feeding passage, thus interfering with operation.

SUMMARY OF THE INVENTION

In view of the foregoing, the present invention is intended to provide a sliding bearing which is capable of suppressing the ingress of foreign particles onto the sliding surface of the sliding bearing, and into the connecting rod bearing through the lubricating oil feeding passage while allowing the oil pressure of the lubricating oil within the mechanism to be secured and augmented.

Specifically, a sliding bearing according to the invention is constructed by a pair of split bearing halves in which one of the split bearing halves is formed in its sliding surface with an oil groove which allows a lubricating oil to flow therearound in a circumferential direction and in which a junction area between the both split bearing halves is formed with crush reliefs toward the sliding surface. In accordance with the invention, the oil groove is formed over the entire circumferential extent of the split bearing half and is open to the junction area between the both split bearing halves through the crush relief and the bottom of the oil groove is formed so that a portion of the crush relief disposed toward the junction is located closer to the center position of the sliding surface in comparison to a central portion as considered in the circumferential, thereby reducing a channel area of the oil groove in a portion disposed toward the junction area.

A sliding bearing according to a second aspect of the invention is constructed by a pair of split bearing halves in which one of the split bearing halves is formed in its sliding surface with an oil groove which allows a lubricating oil to flow therealong in the circumferential direction and in which the crush reliefs are formed at the junction area between the both split bearing halves on a side which is disposed toward the sliding surface. In accordance with the invention, the oil groove comprises a first groove having a given depth over the entire circumferential extent of the split bearing half or formed so that a portion of the split bearing half which is disposed toward the junction area is located nearer the center position of the sliding surface as compared with a central portion thereof as viewed in the circumferential direction, and disposed to be open to the junction area between the split bearing halves through the crush reliefs, and a second groove formed in adjoining relationship with the first groove. The second groove has a bottom which is formed so that a portion disposed toward the junction area as viewed in the circumferential direction of the split bearing half is located nearer the center position of the sliding surface as compared to a central portion thereof, and is terminated short of the junction area between the split bearing halves.

As will be apparent from results of experiments to be described later, in accordance with the invention, the oil groove is opened up to the junction area between the split bearing halves, and accordingly, a foreign particle within the oil groove is restricted from moving onto the sliding surface of the sliding bearing and into the connecting rod bearing through the lubricating oil feeding passage. In addition, because the channel area of the oil groove is reduced in a region disposed toward the junction area, it is possible to secure and augment an oil pressure in the mechanism.

In a similar manner, in accordance with a second aspect of the invention, the end of the first groove of the oil groove is open to the junction area between the split bearing halves, and accordingly, a foreign particle within the oil groove is restricted from moving into the connecting rod bearing through the lubricating oil feeding passage. In addition, because the bottom of the second groove is terminated short of the junction area between the split bearing halves, it is possible to secure and augment an oil pressure within the mechanism.

As mentioned above, the ingress of large quantities of foreign particles from the oil groove onto the sliding surface of the sliding bearing and into the connecting rod bearing through the lubricating oil feeding passage is suppressed and an oil pressure in the main hole can be secured and augmented, allowing a sufficient amount of lubricating oil to be fed to the connecting rod bearing.

Above and other objects, features and advantages of the invention will become apparent from the following description of several embodiments thereof with reference to the drawings.

DETAILED DESCRIPTION OF THE EMBODIMENTS

Figure 1:
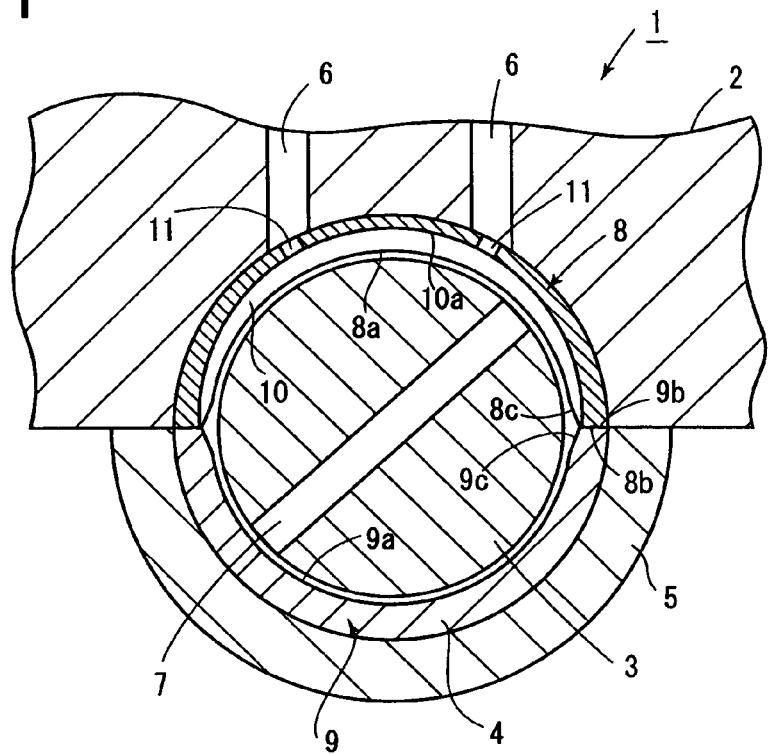
FIG. 1 is a cross section of a sliding bearing of one embodiment of the present invention, as viewed in the axial direction of the crankshaft.
Figure 2:
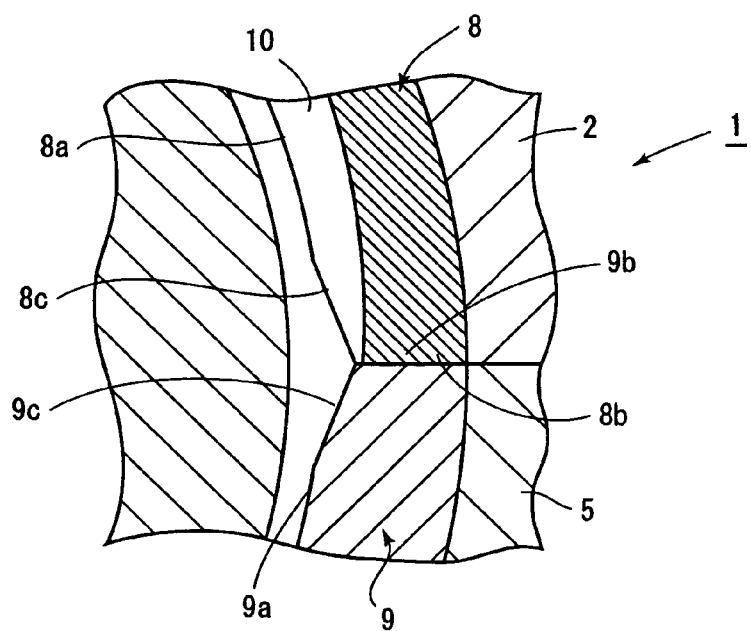
FIG. 2 is a cross section, to a enlarged scale, of a region around a crush relief.

Initially referring to FIG. 1 to describe a first embodiment of the present invention, there is shown a cross section of an engine 1. The engine 1 comprises a cylinder block 2, a crankshaft 3 and a sliding bearing 4. The crankshaft 3 is slidably journaled by the sliding bearing 4, which is secured to the cylinder block 2 by a cap 5.

The cylinder block 2 is formed with a pair of lubricating oil passages 6 which feed a lubricating oil from an oil pump to a space between the crankshaft 3 and a sliding bearing 4, and the crankshaft 3 is formed with a diametrically extending lubricating oil feed passage 7.

As the crankshaft 3 rotates, the lubricating oil disposed between the crankshaft 3 and the bearing 4 passes through the lubricating oil feed passage 7 and thence passes through the crankshaft 3 to be fed to a space, not shown, between the crankshaft and the connecting rod bearing.

The sliding bearing 4 is constructed by an upper split bearing half 8 and a lower split bearing half 9, both semicircular in section and which are vertically separable, and each having a sliding surface 8a or 9a for slidably journaling the crankshaft 3. The upper split bearing half 8 and the lower bearing half 9 each have a junction area 8b and 9b, respectively, formed with crush reliefs 8c and 9c, respectively.

The sliding surface 8a of the upper split bearing half 8 is formed with an oil groove 10 of a given configuration over an entire circumferential extent, and the upper spit bearing half 8 is formed with oil openings 11 in alignment with the lubricating oil passages 6 so as to communicate therewith to pass the lubricating oil to the oil groove 10.

The oil groove 10 has a bottom surface 10a which is of a slightly greater diameter than the sliding surface 8a of the upper split bearing half 8. The bottom surface 10a has a center position which is disposed eccentric toward the sliding surface 8a relative to the center position of the sliding surface 8a and which is in alignment with a line joining the center of the upper split bearing half 8a and the center position of the sliding surface 8a.

It will be seen from the foregoing that in the present embodiment, the oil groove 10 is open to the junction area 8b of the upper split bearing half 8 by passing through the crushing relief, and the bottom surface 10a of the oil groove 10 is formed so as to be located nearer the center of the upper split bearing half 8 in the junction area 8b in comparison to a central portion thereof. In this manner, the channel area of the oil groove 10 is gradually reduced as the junction area 8b is approached.

Figure 3:
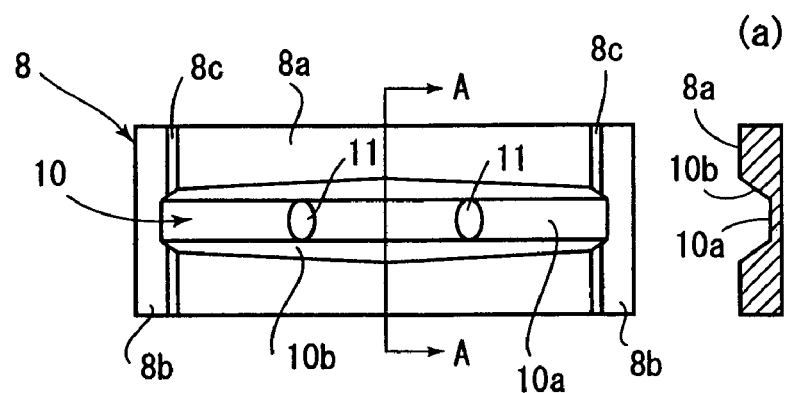
FIG. 3 is a view of an upper split bearing half as viewed from a lower split bearing half, FIG. 3(a) showing a cross section taken along arrows A-A.

FIG. 3 is a view of the upper split bearing half 8 as viewed from the lower split bearing half 9, and FIG. 3(a) shows a cross section taken along arrows A-A which are located centrally on the upper split bearing half 8.

As shown, the bottom surface 10a of the oil groove 10 is a flat surface which is parallel to the sliding surface 8a, and has a constant width over the entire circumferential extent of the upper split bearing half 8. It will be noted that a bevel surface 10b extends from the bottom surface 10a toward the sliding surface 8a at a given angle over the entire circumferential extent of the upper split bearing half 8.

It follows that the channel area of the oil groove 10 becomes reduced toward the junction area 8b when the bottom surface 10a of the oil groove 10 is formed so as to be located nearer the center of the upper split bearing half 8 in the junction area 8b than at a central portion while maintaining the angle of the bevel surface 10b constant.

Advantages which result from using the sliding bearing 4 thus constructed will now be described, but problems which exist with the arrangement of the patent documents 1 and 2 will be described first.

In the sliding bearing according to patent document 1, an oil groove is formed up to the junction area of the lower split bearing half while the bottom surface of the oil groove is located at an equal distance relative to the center position of the sliding surface over the entire circumferential extent.

When the bottom of the oil groove is formed at an equal distance relative to the center position of the sliding surface over the entire circumferential extent, oil leakage through the crush relief increases, causing a reduction in the oil pressure within the bearing and resulting in a failure to maintain a required oil pressure for the engine.

In the sliding bearing according to patent document 2, the bottom of the oil groove is formed so that an end toward the junction area is disposed closer to the center position of the sliding surface as compared with a central portion, but the oil groove has an end located short of the junction area or is terminated midway toward the crush relief.

With such a sliding bearing, the channel area of the oil groove becomes reduced toward the junction area, and oil leakage through the crush relief is reduced, allowing the lubricating oil pressure to be secured and augmented.

However, since the oil groove is terminated midway toward the crush relief on the upper split bearing half, a foreign particle has difficulty being discharged from the end of the oil groove into a space formed between the crush relief and the crankshaft. Accordingly foreign particles will accumulate in the end of the oil groove.

In addition, because the oil leakage through the crush relief is reduced, a large quantity of such foreign particles will accumulate on the sliding surface of the sliding bearing and will be carried into the space between the crankshaft and the connecting rod bearing after passing through the lubricating oil feeding passage, adversely influencing the sliding response of the connecting rod bearing.

As regards the problems mentioned above, in the sliding bearing 4 of the present embodiment, the channel area of the oil groove 10 is reduced toward the junction area 8b, whereby oil leakage through the crush reliefs 8c and 9c is reduced, allowing an oil pressure within the bearing to be secured and augmented.

There is an accumulation of foreign particles on the end of the oil groove 10 in a similar manner as occurs with the sliding bearing according to patent document 2. However, because the oil groove 10 is formed up to the junction area 9b with the lower split bearing half 9, such foreign particles will be discharged into a space formed between the crush reliefs 8c and 9c and crankshaft 8, whereby the accumulation of foreign particles is dispersed.

In this manner, ingress of large quantities of foreign particles from the oil groove 10 onto the sliding surfaces 8a and 9a and into the connecting rod bearing after passing through the lubricating oil feed passage 7 can be suppressed.

Figure 4:
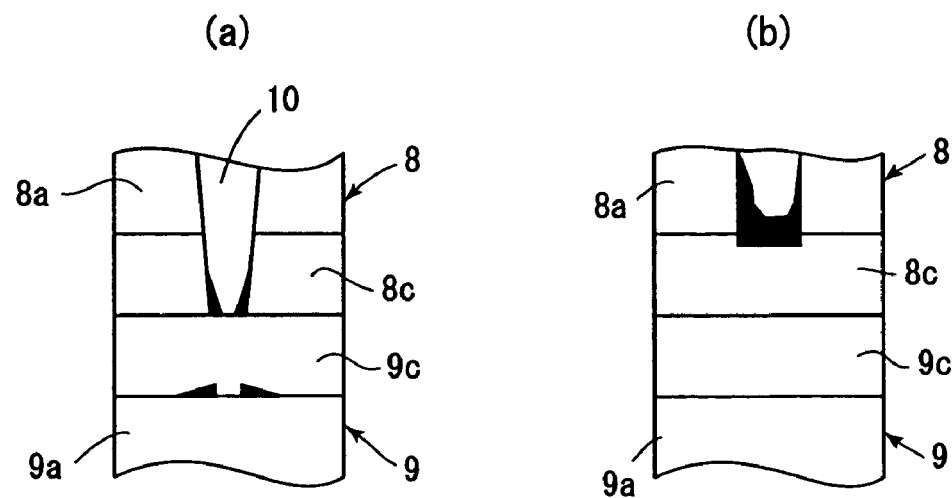
FIGS. 4(a) and (b) illustrate sliding bearings of different types which are used in experiments, also illustrating accumulation of foreign particles on each sliding bearing.

An experiment has been conducted using the engine 1 in which the sliding bearing 4 mentioned above is mounted. The experiment was conducted to verify any difference over a conventional sliding bearing.

engine used . . . series 4 cylinder 1.5 L engine position where sliding bearing is mounted . . . main shaft of crankshaft oil temperature during the experiment . . . 130° C. sliding bearings used in the experiment . . . sliding bearings shown in FIGS. 4(*a*) and (*b*) and a sliding bearing of another type, not shown.

Of the sliding bearings 4 shown in FIG. 4, the sliding bearing shown in FIG. 4(*a*) represents the sliding bearing 4 described in the above embodiment, while the sliding bearing 4 shown in FIG. 4(*b*) is one of the type disclosed in patent document 2. The sliding bearing of the type disclosed in patent document 1 is used as the sliding bearing which is referred to above as "not shown".

It is to be noted that in FIG. 4, a result of rotation of the surface of the crankshaft 3 relative to the sliding surface 8a of the bearing 4 is shown, and for the sliding bearing 4 shown in FIG. 4(*b*), similar parts as shown in present embodiment are designated by like reference characters.

Figure 5:
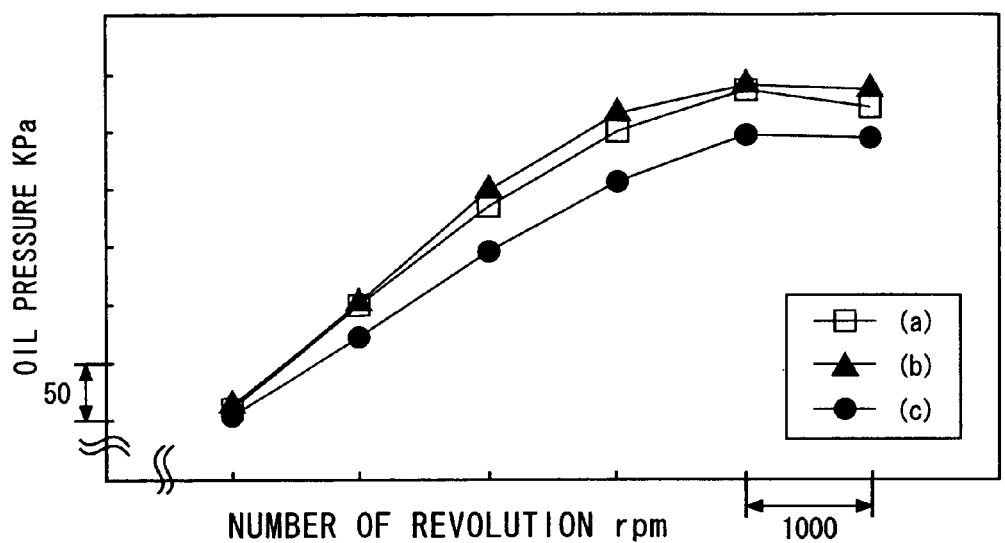
FIG. 5 graphically shows a relationship between oil pressure and number of revolutions, illustrating results of experiments.

FIG. 5 graphically shows results of measurement of oil pressures within the engine 1, the ordinate representing the oil pressure and the abscissa representing the number of revolutions of the engine. In this graph, (a) represents the sliding bearing according to the present embodiment, (b) the sliding bearing according to patent document 2 and (c) the sliding bearing according to patent document 1.

As would be understood from the graph, the sliding bearing 4 according to the present embodiment exhibits a higher oil pressure as compared with the sliding bearing 4 of the type disclosed in patent document 1, and it is seen simultaneously that the oil pressure is substantially comparable to the sliding bearing 4 of the type disclosed in patent document 2.

FIG. 4 shows a result of observation of an accumulation of foreign particles after operating the engine for a given time interval when foreign particles which correspond to ten times a normal value is artificially admixed into the lubricating oil. The accumulation of the foreign particles is indicated by solid black figures in this Figure.

As shown in FIG. 4(*b*), in the sliding bearing 4 disclosed in patent document 2, almost all of the foreign particles do not flow into a space defined by the crankshaft and the crush reliefs 8c, 9c, but instead remain accumulated on the end of the oil groove 10.

By contrast, in the sliding bearing 4 according to the present embodiment which is shown in FIG. 4(*a*), it is seen that foreign particles are accumulated in a dispersed manner in a boundary between the crush relief 9c and the sliding surface 9a of the lower split bearing half 9 and in the downstream end of the oil groove 10.

While the cross-sectional configuration of the oil groove 10 is a bottomed trapezoidal configuration having the bottom 10a which is parallel to the sliding surface 8a, it should be understood that the oil groove 10 may be triangular in section having an apex at the bottom, for example, and it is possible to change the cross-sectional configuration of the oil groove 10 in a suitable manner.

Figure 6:
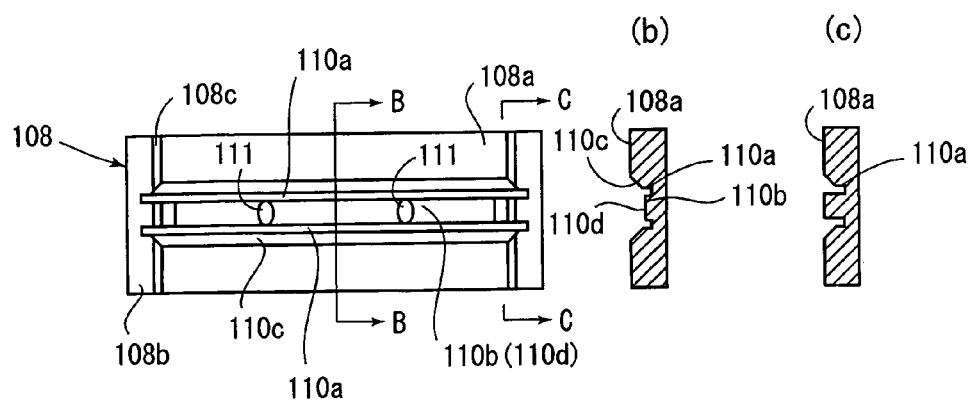
FIG. 6 shows a view of an upper split bearing half according to a second embodiment as viewed from a lower split bearing half, FIG. 6(b) showing a cross section taken along arrows B-B, and FIG. 6(c) showing a cross section taken along arrows C-C.

FIG. 6 shows a second embodiment of the present invention. It is to be understood that only an upper split bearing half 108 is shown in FIG. 6 and remaining portions are constructed in the similar manner as in the previous embodiment. In this embodiment, parts corresponding to those shown in the first embodiment are designated by like reference characters as used before, to which 100 is added.

In this embodiment, the upper split bearing half 108 has an oil groove 110 which comprises a pair of first grooves 110a having a given depth over the entire circumferential extent, a second groove 110b formed between the first grooves 110a, and a chamfering 110c formed on the external side of the first groove 110a.

The first groove 110a extends through a crush refllief 108c to be open to a junction area 108b while the second groove 110b has a bottom surface 110d which is formed so that it is located closer to the center position of a sliding surface 108a as the bottom surface shifts from a central portion toward the junction area 108b as considered in the circumferential direction of the upper split bearing half 108. It is to be noted that the bottom surface 110d of the second groove 110b is merged with the sliding surface 108a to terminate at a location short of the crush relief 108c.

The sliding bearing 104 constructed in the manner mentioned above achieves a similar effect as achieved by the sliding bearing 4 described in the first, embodiment. Specifically, by reducing an oil leakage by the provision of the second groove 110b, it is possible to secure and augment an oil pressure of the lubricating oil. The first groove 110a is effective to discharge foreign particles within a lubricating oil into a space between the crush reliefs 108c, 109c and a crankshaft 103, thus suppressing the ingress of large quantities of foreign particles from the oil groove 110 onto sliding surfaces 108a, 109a and into a connecting rod bearing through a lubricating oil feed passage 107.

While the first groove 110a of this embodiment is formed to have a given depth over the entire circumferential extent, it should be understood that the first groove 110a may be formed such that it is closer to the midpoint of the upper split bearing half 108 in the region of the junction area 108b in comparison to a central portion thereof in the similar manner as the bottom surface 10a of the oil groove 10 in the first embodiment.

Figure 7:
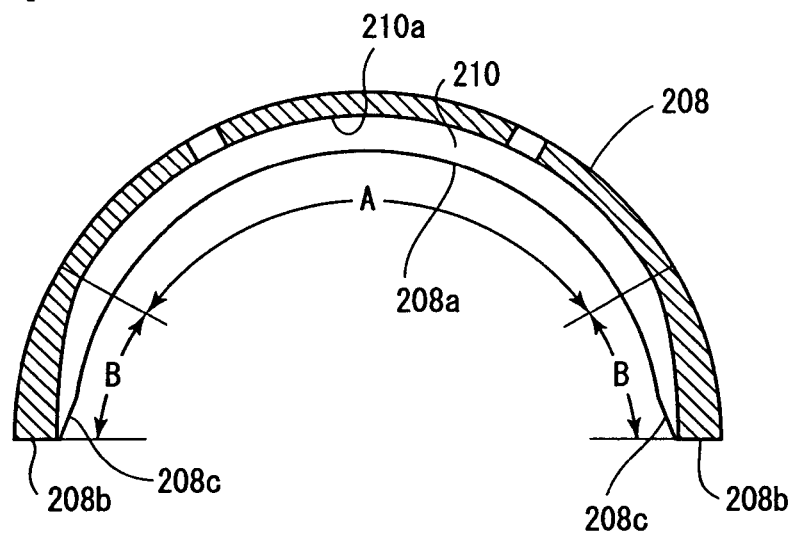
FIG. 7 is a cross section of an upper split bearing half according to a third embodiment as viewed in the axial direction of the crankshaft.

FIG. 7 shows a third embodiment of the present invention. Only an upper split bearing half 208 is shown in FIG. 7 and remaining portions are constructed in a similar manner as in the preceding embodiments. It is to be understood that in this embodiment, parts corresponding to those shown in the first embodiment are designated by like difference characters as used before, to which 200 is added.

In this embodiment, the upper split bearing half 208 has an oil groove 210 which includes a portion where a bottom surface 210a of the oil groove 210 has a constant depth in distinction to the upper split bearing half 8 shown in the first embodiment.

Specifically, in a given range (indicated by a zone A in this Figure) around the central portion of the upper split bearing half 208, a bottom surface 210a is located at an equal distance from the center position of a sliding surface 208a, and in the both opposite end regions (zone B in this Figure), the bottom surface 210a is formed to be located closer to the center position of the sliding surface 208a as the junction area 208b is approached.

Again, the end of the oil groove 210 is open to the junction area 208b, and because the bottom surface 210a of the oil groove 210 is located closer to the center position of the sliding surface 208a in the range B, the channel area of the oil groove 210 becomes reduced as the junction area 210 is approached.

The sliding bearing 204 constructed in the manner mentioned above is also capable of achieving a similar effect as the sliding bearing 4 described in the first embodiment.

Specifically, in the range B, the channel area of the oil groove 210 becomes reduced toward the junction area 208b, allowing the pressure of the lubricating oil to be secured and augmented. Since the oil groove 210 is open to the junction area 210b, foreign particles within the lubricating oil can be discharged into a space between crush reliefs 208c, 209c and a crankshaft 203, suppressing the ingress of large quantities of foreign particles from the oil groove 210 onto sliding surfaces 208a, 209a and into a connecting rod bearing after passing through a lubricating oil feed passage 207.

The range B may be chosen at least within a range of the crush relief 208c on the upper split bearing half 208, and the described effect still can be achieved with this configuration.

Figure 8:
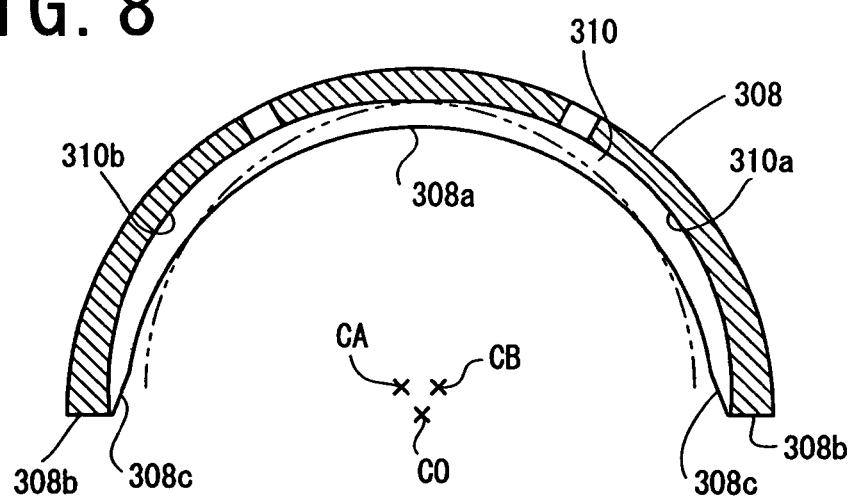
FIG. 8 is a cross section of an upper split bearing half according to a fourth embodiment as viewed in the axial direction of the crankshaft.

FIG. 8 shows a fourth embodiment of the present invention. Only an upper split bearing half 308 is shown in FIG. 8, and remaining portions are constructed in the similar manner as in the described embodiments. In this embodiment, parts corresponding to those shown in the first embodiment are designated by like reference characters as used before, to which 300 is added.

In the upper split bearing half 308 of the present embodiment, an oil groove 310 has a bottom surface which is formed by using two arcs, namely, a first arc 310a and a second arc 310b which are of a smaller diameter as compared with a sliding surface 308a of the upper split bearing half 308.

The first arc 310a and the second arc 310b have center positions CA and CB, respectively, which are eccentrically located to the left and to the right, as viewed in this Figure, with respect to the center position CO of the sliding surface 308a, and also upwardly shifted as viewed in this Figure.

Accordingly, at the midpoint of the upper split bearing half 308, the point of intersection between the both arcs 310a and 310b is close to the center position CO of the sliding surface 308a, and both arcs 310a and 310b are once removed from the center position CO as they are circumferentially removed from their such point of intersection, and then are located closer to the center position CO again as the junction areas 308b are approached.

As in the previous embodiments, the oil groove 310 of this embodiment extends through the crush reliefs to be open to the junction area 308b of the upper split bearing half 308.

Accordingly, in this embodiment also, the channel area of the oil groove 310 becomes reduced as the junction areas 308b are approached.

While the first arc 310a and the second arc 310b have diameters which are less than the diameter of the sliding surface 308a, as a matter of practice, it is only necessary that these arcs have diameters less than the outer periphery of the upper split bearing half 308. In addition, the oil groove 310 may be defined by more arc surfaces.

A sliding surface 304 constructed in the manner mentioned above can achieve a similar effect as achieved by the sliding bearing 4 shown in the first embodiment.

Specifically, since the channel area of the oil groove 310 becomes reduced as the junction areas 308b are approached in this embodiment, it is possible to secure and augment lubricating oil pressure. Since the oil groove 310 is open to the junction areas 308b, foreign particles within the lubricating oil can be discharged into a space defined between crush reliefs 308c, 309c and a crankshaft 303, whereby the ingress of large quantities of foreign particles from the oil groove 310 onto the sliding surfaces 308a and 309a and into a connecting rod bearing after passing through a lubricating oil feed passage 307 can be suppressed.

While the invention has been specifically described above in connection with several embodiments thereof, it should be understood that a number of changes, modifications and substitutions therein are possible without departing from the spirit and the scope of the invention defined in appended Claims.

What is claimed is:

1. A sliding bearing, comprising:
a first split bearing half having a sliding surface including an oil groove for channeling a lubricating oil in a circumferential direction within the oil groove; and
a second split bearing half, the first and second split bearing halves including crush reliefs at a junction area along the sliding surface between the first and second split bearing halves, the crush reliefs forming a cut extending throughout the lengths of the first and second bearing halves and having at least one straight side surface extending from the junction area between the first and second split bearing halves to the sliding surface for allowing both split bearing halves to deform radially inward,
wherein the oil groove is formed over the entire circumferential extent of the first split bearing half, the oil groove extending through the crush reliefs to be open to the junction area between the split bearing halves and having a bottom which is formed so that a portion disposed toward the junction area as considered in the circumferential direction of the crush relief is located closer to the center position of the sliding surface as compared with a central portion thereof, thus reducing the channel area of the oil groove toward the junction area.

2. A sliding bearing according to claim 1, wherein the bottom of the oil groove is formed to be of a greater diameter as compared with the sliding surface of the first split bearing half, the center position of a circle defining the bottom being eccentrically located toward the sliding surface relative to the center position of a circle defining the sliding surface, and the center position of the circle defining the bottom being in alignment with a phantom line joining the center of the split bearing half in the circumferential direction and the center position of the circle defining the sliding surface.

3. A sliding bearing according to claim 1, wherein the bottom of the oil groove is formed to be at an equal distance from the center position of the sliding surface within a first range from a central portion of the first split bearing half, and in which in a second range extending from the opposite ends of the first range to the junction areas of the first split bearing half, the bottom is located closer to the center position of the sliding surface as the junction areas of the first and second split bearing halves are approached.

4. A sliding bearing according to claim 1, wherein the bottom of the oil groove is formed at least by a first arc surface and a second arc surface which are adjacent to each other in the circumferential direction, the arc surfaces having diameters which are less than the outer periphery of the first split bearing half, and the center positions of circles defining the arc surfaces being eccentrically located relative to the center position of a circle defining the sliding surface.

5. A sliding bearing according to claim 1, wherein the oil groove has a bevel lateral surface which spreads at a given angle toward the center position of the sliding surface from the bottom.

6. A sliding bearing according to claim 1, wherein the bottom is a flat surface which is parallel to the sliding surface of the first split bearing half.

7. A sliding bearing according to claim 1, wherein a space is formed between the crush reliefs and a crankshaft for foreign particles contained in the lubricating oil to be discharged into.

8. A sliding bearing according to claim 1, wherein the crush reliefs consist of the cut.

9. A sliding bearing, comprising:
a first split bearing half having a sliding surface including an oil groove for channeling a lubricating oil in a circumferential direction within the oil groove; and
a second split bearing half, the first and second split bearing halves including crush reliefs at a junction area along the sliding surface between the first and second split bearing halves,
wherein the oil groove comprises a first groove having a given depth over the entire circumferential extent of the split bearing half and a second groove formed in adjoining relationship with the first groove, the second groove having a bottom which is formed so that a portion disposed toward the junction area as considered in the circumferential direction of the split bearing half is located closer to the center position of the sliding surface in comparison to a central portion of the second groove, and which is terminated short of the junction area of the split bearing halves.

10. A sliding bearing according to claim 9, wherein the bottom of the second groove is terminated short of the crush reliefs.

11. A sliding bearing according to claim 9, wherein a space is formed between the crush reliefs and a crankshaft for foreign particles contained in the lubricating oil to be discharged into.

* * * * *